United States Patent [19]
Schweigert et al.

[11] Patent Number: 5,833,912
[45] Date of Patent: Nov. 10, 1998

[54] METHOD OF INJECTION MOLDING A CONTAINER

[76] Inventors: Lothar Schweigert, P.O. Box 3765, Incline Village, Nev. 89450; Ui Hwan O, 934 Third Ave., Los Angeles, Calif. 90019

[21] Appl. No.: 950,153

[22] Filed: Oct. 14, 1997

[51] Int. Cl.⁶ .................................................. B29C 45/44
[52] U.S. Cl. ...................... 264/318; 264/328.1; 264/334; 264/336; 425/556; 425/438; 425/DIG. 58; 249/59
[58] Field of Search ................................. 264/318, 328.1, 264/334, 336; 249/59; 425/556, 577, 438, 441, DIG. 58

[56] References Cited

U.S. PATENT DOCUMENTS

| | | |
|---|---|---|
| 3,339,242 | 9/1967 | Lamb . |
| 3,343,222 | 9/1967 | Kacalieff .......................... 425/DIG. 58 |
| 3,402,713 | 9/1968 | Senkowski et al. ..................... 264/318 |
| 3,618,170 | 11/1971 | Owens . |
| 3,865,529 | 2/1975 | Guzzo . |
| 4,005,101 | 1/1977 | Ruch ........................................ 264/318 |
| 4,155,698 | 5/1979 | Aichinger ......................... 425/DIG. 58 |
| 4,383,819 | 5/1983 | Letica . |
| 4,497,765 | 2/1985 | Wilde et al. ................................ 249/59 |
| 4,502,660 | 3/1985 | Luther et al. . |
| 4,552,328 | 11/1985 | Dutt et al. ................................. 249/59 |
| 4,676,732 | 6/1987 | Letica . |
| 4,708,632 | 11/1987 | Mitteregger et al. . |
| 4,731,014 | 3/1988 | VonHoldt . |
| 4,777,004 | 10/1988 | Galer ........................................ 264/318 |
| 4,832,307 | 5/1989 | Watanabe et al. . |
| 4,854,849 | 8/1989 | Sudo . |
| 4,881,891 | 11/1989 | Luther . |
| 4,881,892 | 11/1989 | Webster et al. .................. 425/DIG. 58 |
| 5,232,718 | 8/1993 | Miyazawa et al. . |
| 5,609,894 | 3/1997 | Rathbun .......................... 425/DIG. 58 |

*Primary Examiner*—Jill L. Heitbrink
*Attorney, Agent, or Firm*—Wood, Herron & Evans, L.L.P.

[57] ABSTRACT

A method of injection molding a container having a body and an upper opening surrounding a neck of a container produces a container in which a diameter of the body is greater than the diameter of the neck. The method includes injecting plastic or other appropriate material into a cavity of the mold assembly and, after the container material has cooled sufficiently to retain its shape, sequentially removing portions of the mold assembly from the container.

14 Claims, 2 Drawing Sheets

METHOD OF INJECTION MOLDING A CONTAINER

BACKGROUND OF THE INVENTION

This invention relates to a container and, more particularly, to an injection molded container and a method for injection molding a container in which the upper neck portion of the container has a smaller diameter than a body portion of the container.

Injection molded containers are well known in the art. Typically, such containers are made of any one of a number of plastics such as polypropylene, polyethylene or the like. Injection molding has proven to be very reliable and efficient for the mass production of plastic containers, jars or other receptacles. However, one problem associated with injection molding containers or jars is the limitations on the configuration of the resulting container. Specifically, due to the geometry of the mold required for the injection molding process, for consistent and efficient removal of the formed container from the mold, an upper neck region proximate an opening of the container must have at least as big a diameter as the body of the container. Otherwise, the container could not be removed from the portion of the mold in the interior of the container without great difficulty or damage to the container.

Therefore, known methods of obtaining a molded container in which a body portion of the container has a greater diameter than the upper rim or neck include injection blow molding, blow molding or rotation molding. However, each of these alternative methods for molding are more complex, include additional complications or limitations in the molding process, are less reliable and efficient and are generally considered inferior to standard injection molding for one or more of these reasons. Importantly, these manufacturing processes are significantly more time consuming than standard injection molding which is a very important aspect of an automated, mass production operation.

Therefore, it has become apparent that a fast, simple, efficient, reliable and economical method of injection molding a container having a body with a larger diameter than a neck of the container is highly desirable.

SUMMARY OF THE INVENTION

This invention offers an efficient, reliable and economic method for producing an injection molded container having a body with a larger diameter than the upper rim or neck portion of the container. The method of injection molding a container having a body and an upper opening proximate a neck of the container includes injecting plastic into a cavity of a mold assembly. The mold assembly includes a mold base having a well. The mold assembly also includes an ejector assembly and a ring such that a portion of the ejector assembly is initially positioned in the well of the mold base to form the body of the container when the plastic is injected therein. The ring is initially positioned between the mold base and the ejector assembly to form the neck of the container. Once the plastic has cooled enough to retain its shape, the mold begins to open by initially separating the mold base from the ejector assembly and thereby removing the container from the well of the mold base.

The ejector assembly comprises a number of distinct parts including an ejector, a core insert and a mold core. The core insert is positioned generally between the ejector and the mold core. The next step in the method of injection molding the container is the removal of the mold core from the container. A portion of the mold core is initially positioned on the interior circumference of the neck of the container. Therefore, removal of the mold core from the container exposes the inside circumference of the neck as being unsupported.

The next step in the injection molding process is the removal of the ring from the exterior circumference of the neck of the container by temporarily compressing the neck inwardly so that the ring is axially removed from the container. Compression of the neck inwardly is possible because the mold core has been removed from the container and the neck is unsupported. Similarly, removal of the ring from the neck exposes the outside circumference of the neck as unsupported.

Next, the core insert which is initially positioned around the inner circumference of the body portion of the container is removed from the container by temporarily expanding the neck outwardly to allow the core insert to pass through the neck and out of the container. As a result, only the injector which may comprise two pieces remains in the container and the diameter of the ejector is sized so that it can be easily removed through the neck of the container thereby leaving the injection molded container having a body with a greater diameter than the neck of the container. Additionally, threads may be formed on the outer circumference of the neck or other appropriate closure mechanisms for mating the container with a lid, cap or similar closure.

BRIEF DESCRIPTION OF THE DRAWINGS

The objectives and features of a invention will become more readily apparent from the following detailed description taken in conjunction with the accompanying drawings in which.

DETAILED DESCRIPTION OF THE INVENTION

Figure 1:
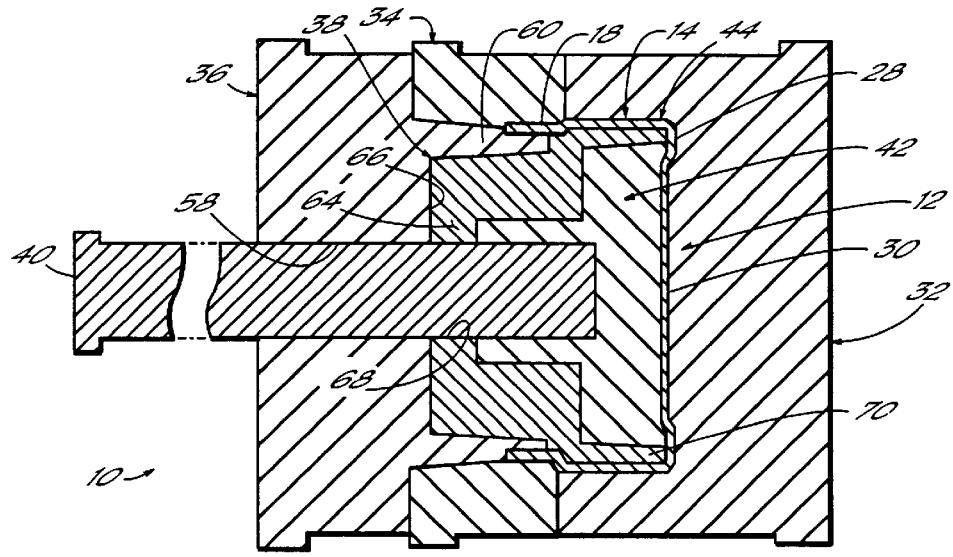
FIG. 1 is a cross-sectional view of a mold assembly with container material injected into the mold assembly to form a container according to a presently preferred embodiment of this invention.
Figure 6:
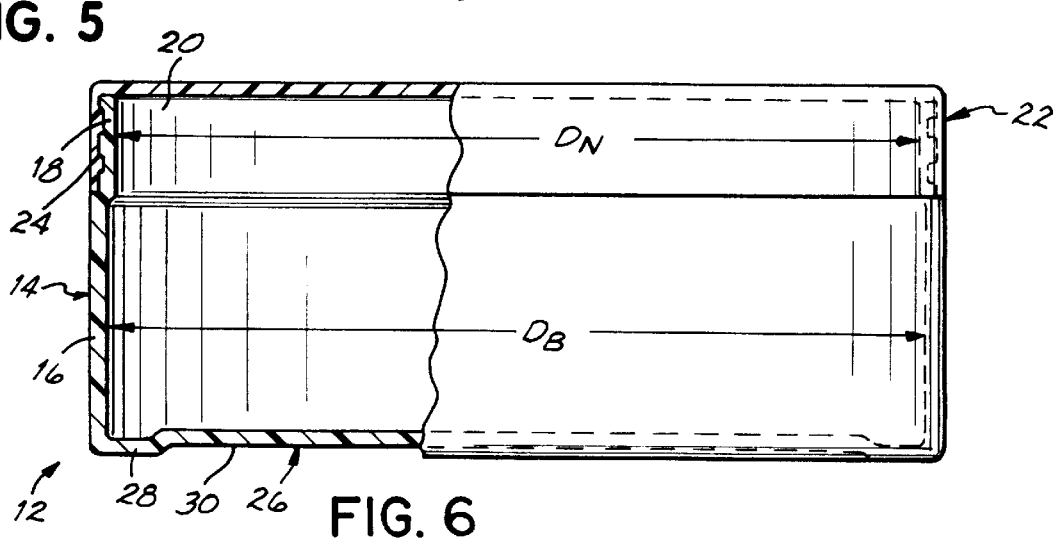
FIG. 6 is a side elevational view of the container and a mating lid partially broken away in cross-section.

Referring to FIG. 1, a mold assembly 10 for injection molding a container 12 according to this invention is shown. The container 12, also shown in FIG. 6, preferably is injected molded from a plastic material such as polypropylene, polyethylene or similar materials and is shown in the figures in a six ounce size for exemplary purposes only. The container 12 includes a body 14 defined in part by a circumferential sidewall 16 of the container 12. The container 12 also includes a neck 18 which is integrally molded with the body 14 and surrounds an upper opening 20 of the container 12. As seen particularly in FIG. 6, an inner diameter $D_B$ of the body 14 of the container 12 is larger than an inner diameter $D_N$ of the neck 18; however, other corresponding dimensions or diameters of the body 14 and neck 18 maybe used as a reference in this regard within the scope of this invention. Moreover, although a round container is shown in the drawings and the terms "diameter", "circumference" and derivatives thereof are used herein and in the following claims, this invention is not limited to a round or other specific shape container.

The container opening 20 can be selectively closed by a lid or closure 22 which can be coupled to the container 12 by interengaging threads 24 on the lid 22 and the outer circumference of the neck 18. Alternatively, the lid 22 could be a snap or bayonet fitting or other appropriate closure mechanism as is readily appreciated by those of ordinary skill in the art. The lid 22 may include a liner (not shown) which is retained in the lid 22 by adhesive, a friction fit or other known methods. The container 12 also includes a bottom 26 which includes a generally circular peripheral rim 28 surrounding a centrally located panel 30 of the bottom.

Referring to FIGS. 1–5, the mold assembly 10, according to a presently preferred embodiment of this invention, comprises a mold base 32, a ring 34, a mold core 36, a core insert 38, an ejector rod 40, and an ejector insert 42 all of which contribute to defining a cavity 44 in the mold assembly 10 into which the container material, plastic or the like, is injected to form the container 12 as shown in FIG. 1. The mold base 32 includes a well 46 which is sized and configured to form the outer profile of the container body 14 and the bottom 26 of the container 12 including an annular groove 48 surrounding a circular projection 50 which define the rim 28 and central panel 30, respectively, of the bottom 26 of the container 12. A generally planar surface 52 of the ring 34 mates with a generally planar surface 54 of the mold core 36 as shown in FIG. 1. A portion of the ring 34 is spaced from a portion of the core insert 38 and the mold core 36 to define therebetween the neck 18 of the container 12. The ring 34 surrounds the outer circumference of the neck 18 and is seated in an annular cut-out 56 of the mold core 36 so that it is positioned intermediate the mold core 36 and the mold base 32.

The mold core 36 includes a central hole 58 through which the ejector rod 40 projects for translational movement. The mold core 36 also includes a flange 60 positioned between the ring 34 and the core insert 38. The flange 60 of the mold core 36 includes an annular notch 62 on the terminal or outer forwardmost portion thereof. The notch 62 combines with the ring 34 to define the neck 18 of the container 12 and is positioned to support the inner circumference of the neck 18 as shown in FIGS. 1 and 2.

The core insert 38 includes a basal portion 64 which is seated within a recess 66 defined by the flange 60 of the mold core 36. A hole 68 is provided through the center of the basal portion 64 of the core insert 38 for the ejector rod 40 to project and translate therethrough. The hole 68 in the core insert 38 is aligned with the hole 58 in the mold core 36 for the ejector rod 40. An extending ferrule 70 projects from the basal portion 64 into the well 46 of the mold base 32. The terminal end of the ferrule 70 is seated within the rim 28 of the bottom 26 of the container 12. An annular ridge 72 is provided at the base of the ferrule 70 to form a transition between the neck 18 and body 14 of the container 12. The outer circumference of the ferrule 70 is positioned adjacent the inner circumference of the body 14 of the container 12. The ejector insert 42 is attached to the terminal end of the ejector rod 40. A terminal face 74 of the ejector insert 42 forms the inner surface of the bottom 26 of the container 12 including a portion of the rim 28 and the central panel 30.

Referring to FIG. 1, the process of injection molding the container 12 with the mold assembly 10 begins with injecting the plastic into the mold assembly 10 of FIG. 1 to form the container neck 18, including the body 14 and bottom 26. Preferably, a standard molding temperature of approximately 420° F. is used. After the container material such as plastic, polypropylene, polyethylene or the like has cooled enough to retain its shape, typically on the order of approximately 8–9 seconds in a presently preferred embodiment, the mold 10 begins to open. The first step is the separation of the mold base 32 from the remainder of the mold assembly 10; namely, the ejector assembly. The ejector assembly comprises the ejector rod 40, the ejector insert 42, the core insert 38 and the mold core 36 in a presently preferred embodiment of this invention. The mold base 32 is separated from the ejector assembly by removal in the direction of arrow A from the container 12 so that the container 12 is dislodged from the well 46 of the mold base 32 as shown in FIG. 2. It should be readily understood by those of ordinary skill in the art that the injection molding process as described herein refers to typically linear translation or movement in various directions such as forward or the like; however, the method of injecting molding the container according to this invention can be readily practiced by movement of the various mold components or equivalents thereof in other directions, relative to one another or in other sequences within the scope of this invention.

Figure 2:
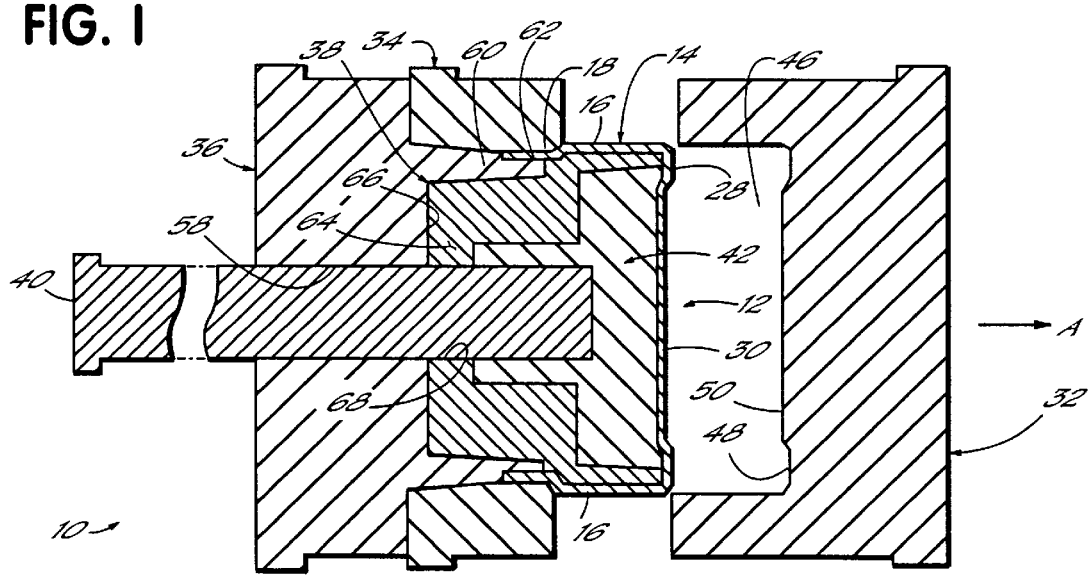
FIG. 2 is a view similar to FIG. 1 showing a mold base of the mold assembly being removed from the container.
Figure 3:
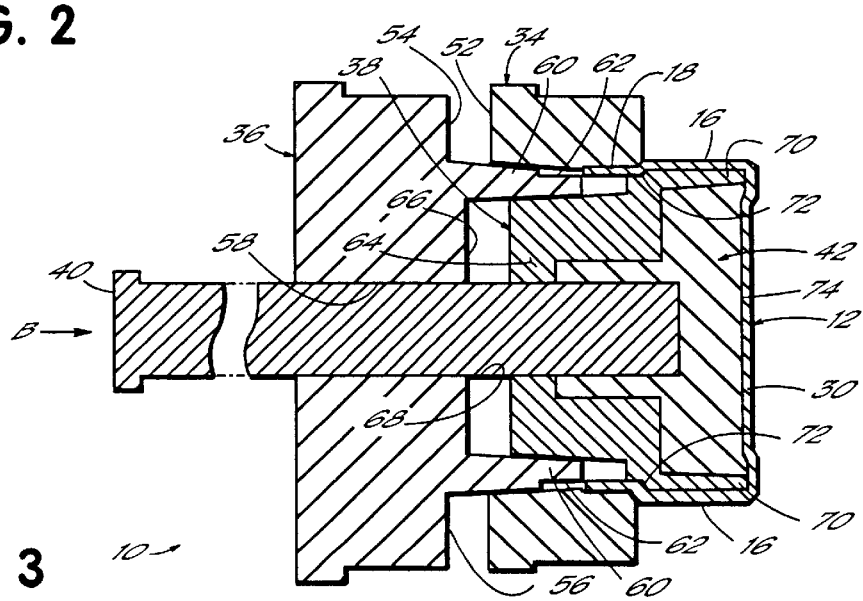
FIG. 3 is a view similar to FIG. 2 showing a mold core being removed from the container to expose the inner circumference of a neck of the container.

As the mold base 32 is separated from the container 12, the container 12 remains attached to the ejector insert 42, the core insert 38, the ring 34 and the mold core 36 as shown in FIG. 2. The next step in the injection molding process is to advance the ejector rod 40 forward while the mold core 36 remains stationary thereby projecting the ejector rod 40 through the hole 58 in the mold core 36 in the direction of arrow B of FIG. 3. As the ejector rod 40 is moved relative to the mold core 36, the container 12, core insert 38, ejector insert 42 and ring 34 move forward as a single unit. As a result, a first portion of the ejector assembly, namely the flange 60 of the mold core 36, is removed from the container 12 thereby leaving the inner circumference of the neck 18 of the container 12 unsupported as shown in FIG. 3.

Figure 4:
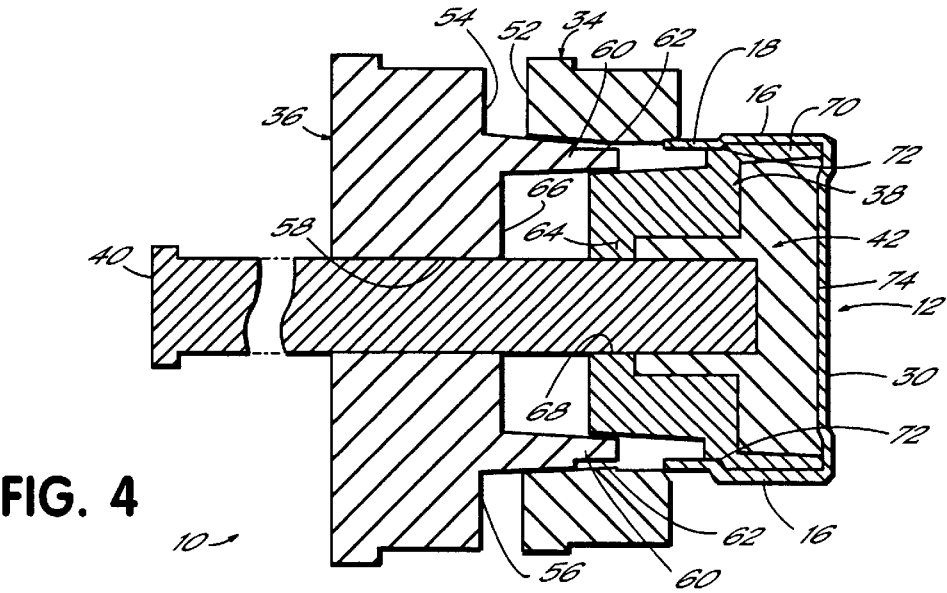
FIG. 4 is a view similar to FIG. 3 showing a ring of the mold assembly being removed from the outer circumference of the neck.

As the ejector rod 40 continues to advance forwardly through the mold core 36 in the direction of arrow B, the core insert 38 and ejector insert 42 along with the container 12 advance forwardly. As shown in FIG. 4, with the continued movement of the ejector rod 40 and container 12 relative to the mold core 36, the ring 34 is restricted from continued movement by shoulder bolts (not shown), connecting the ring 34 to the mold core 36. Therefore, movement of the ring 34 ceases as shown in FIG. 4. Since the inside circumference of the neck 18 of the container 12 is unsupported at this point, the ejector rod 40 continues to push the container 12 forward and the unsupported neck 18 compresses inwardly enough to allow it to escape the grip of the ring 34.

Figure 5:
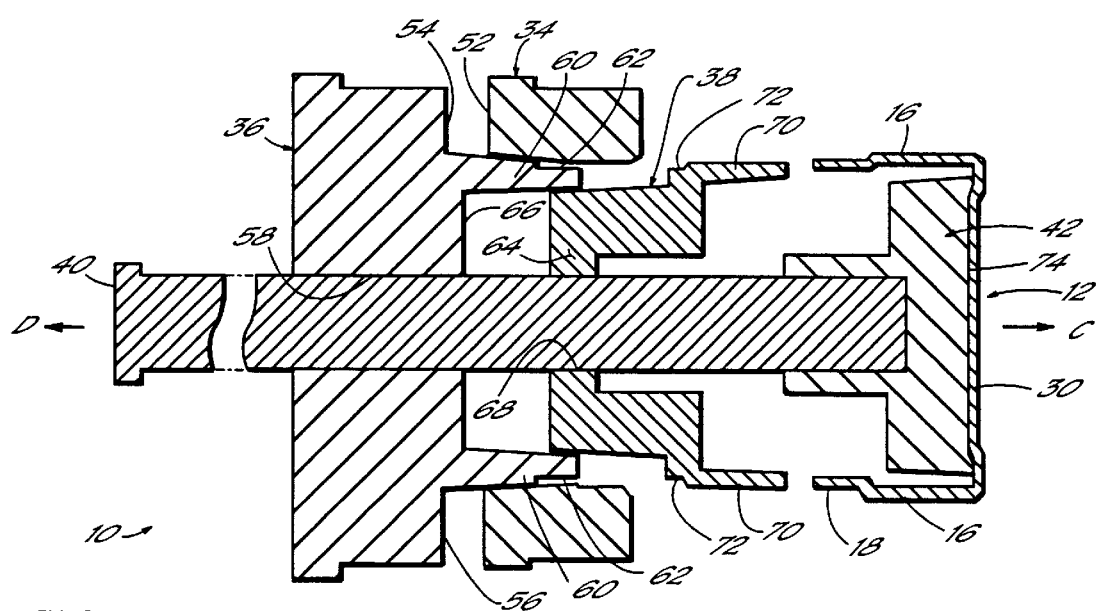
FIG. 5 is a view similar to FIG. 4 showing a core insert of the mold assembly being removed from the container and the injection molded container being removed from the ejector.

Referring to FIG. 5, after the container neck 18 is free of the ring 34, the core insert 38, which is attached to the mold core 36 with shoulder screws (not shown), is restricted from further movement forward. Therefore, as the ejector rod 40 and ejector insert 42 continue to push the container forward in the direction of arrow C of FIG. 5, the core insert 38 is limited from further movement in that direction. The neck 18 of the container 12 expands sufficiently for the core insert 38 to be removed from the container 12. Therefore, as the ejector rod 40 and ejector insert 42 advance forwardly in the direction of arrow C of FIG. 5, the container 12 is freed from the core insert 38. After the container 12 is freed from the core insert 38, the ejector rod 40 and ejector insert 42 are retracted in the direction of arrow D in FIG. 5 to reassemble the components of the ejector assembly and thereby eject the container 12 off of the core insert 38 to complete the injection molding process of the container 12. In a presently preferred embodiment of this invention, the injection molding process shown and described with respect to FIGS. 1–5 takes approximately 10–13 seconds per "shot" i.e., for the formation of a single container 12. Whereas, the formation process of a single container according to prior art methods takes about 2–3 seconds longer, which is significant considering the mass production and volume of containers manufactured in a commercial industrial environment. Due to the mold assembly 10 of this invention, a container having a body with a greater diameter than a neck thereof can be injection molded quickly, efficiently and economically.

From the above disclosure of the general principles of the present invention and the preceding detailed description of a preferred embodiment, those skilled in the art will readily comprehend the various modifications to which this invention is susceptible. Therefore, we desire to be limited only by the scope of the following claims and equivalents thereof.

We claim:

1. A method of injection molding a container having a body and an upper opening proximate a neck of the container, a diameter of the body being greater than a diameter of the neck, the method comprising:
    injecting plastic into a cavity of a mold assembly in which the mold assembly comprises a mold base having a well, an ejector assembly having a first portion and a second portion, and a ring, wherein the ejector assembly is initially at least partially positioned in the well of the mold base to form the body of the container and the first portion of the ejector assembly forms the interior portion of the neck and the ring is positioned intermediate the mold base and the ejector assembly to form the exterior circumference of the neck of the container;
    separating the mold base from the ejector assembly and thereby removing the container from the well;
    removing the first portion of the ejector assembly from the container;
    removing the ring from the exterior circumference of the neck of the container by temporarily compressing the neck inwardly; and
    removing the second portion of the ejector assembly from the container by temporarily expanding the neck outwardly after the ring is removed from the exterior circumference of the neck.

2. The method of claim 1 further comprising:
    cooling the plastic sufficiently for it to retain its shape prior to the separation of the mold base from the ejector assembly.

3. The method of claim 1 wherein the ejector assembly further comprises an ejector, a core insert and a mold core, wherein the first portion of the ejector assembly is the mold core and the second portion of the ejector assembly is the core insert and the core insert is positioned intermediate the ejector and the mold core.

4. The method of claim 1 further comprising:
    removing the container from the ejector assembly.

5. The method of claim 1 wherein the removal of the first portion of the ejector assembly exposes the inside circumference of the neck as unsupported.

6. The method of claim 1 wherein the removal of the ring exposes the outside circumference of the neck as unsupported.

7. The method of claim 1 further comprising:
    forming a thread configuration on the outside circumference of the neck.

8. The method of claim 1 wherein the first portion of the ejector assembly is positioned adjacent the inside circumference of the neck prior to its removal from the container.

9. A method of injection molding a container having a body and an upper opening surrounded by a neck of the container, the method comprising:
    injecting plastic into a cavity of a mold assembly in which the mold assembly comprises a mold base having a well, an ejector assembly having a first portion and a second portion, and a ring, wherein the ejector assembly is initially at least partially positioned in the well of the mold base to form the body of the container and the first portion of the ejector assembly forms the interior portion of the neck and the ring is positioned intermediate the mold base and the ejector assembly to form the exterior circumference of the neck of the container, wherein a diameter of the body is greater than a diameter of the neck;
    separating the mold base from the ejector assembly and thereby removing the container from the well;
    removing the first portion of the ejector assembly proximate the neck from the container;
    removing the ring from the exterior circumference of the neck of the container by temporarily compressing the neck inwardly; and
    removing the second portion of the ejector assembly proximate the body from the container by temporarily expanding the neck outwardly after the ring is removed from the exterior circumference of the neck.

10. A method of injection molding a container having a body and an upper opening surrounded by a neck of the container, the method comprising:
    injecting plastic into a cavity of a mold assembly in which the mold assembly comprises a mold base having a well, an ejector, a core insert, a mold core and a ring, wherein the ejector and the core insert are initially positioned in and spaced from the well of the mold base to form the body of the container and the mold core forms the interior portion of the neck and the ring is positioned intermediate the mold base and the mold core to form the exterior circumference of the neck of the container, wherein a diameter of the body is greater than a diameter of the neck;
    separating the mold base from the ejector, the ring, the core insert and the mold core to thereby remove the container from the well;
    cooling the plastic sufficiently for it to retain its shape prior to the separation of the mold base;
    removing the mold core from the container thereby leaving the inner circumference of the neck unsupported;
    removing the ring from the exterior circumference of the neck of the container by temporarily compressing the neck inwardly and thereby leaving the outer circumference of the neck unsupported;
    removing the core insert from the container by temporarily expanding the neck outwardly after the ring is removed from the exterior circumference of the neck;
    forming a thread configuration on the outside circumference of the neck; and
    removing the container from the ejector.

11. The method of claim 10 wherein the separation of the mold base, the removal of the core base, the removal of the ring and the removal of the core insert are each accomplished by linear translation with respect to a remainder of the mold assembly.

12. The method of claim 11 wherein the separation of the mold base comprises moving the mold base in a first direction relative to the container and the removal of the core base, the removal of the ring and the removal of the core insert each comprise translation with respect to the container in a second direction opposite to the first direction.

13. A method of injection molding a container having a body and a neck, a terminal edge of the neck surrounding an upper opening of the container, a diameter of the body being greater than a diameter of the neck, the method comprising:

injecting plastic into a cavity of a mold assembly in which the mold assembly comprises a mold base having a well, an ejector assembly having a first portion and a second portion, and a ring, wherein the ejector assembly is initially at least partially positioned in the well of the mold base to form the body of the container and the first portion of the ejector assembly forms the interior portion of the neck and the ring is positioned intermediate the mold base and the ejector assembly, the ring covers substantially the entire exterior circumference of the neck adjacent the terminal edge and forms the exterior circumference of the neck of the container;

separating the mold base from the ejector assembly and thereby removing the container from the well;

removing the first portion of the ejector assembly from the container;

removing the ring from the exterior circumference of the neck and terminal edge thereof by temporarily compressing the neck inwardly; and removing the second portion of the ejector assembly from the container by temporarily expanding the neck outwardly.

14. The method of claim 13 wherein the removal of the second portion of the ejector assembly is accomplished after the ring is removed from the exterior circumference of the neck.

* * * * *